United States Patent
Fein et al.

(10) Patent No.: US 9,641,871 B1
(45) Date of Patent: May 2, 2017

(54) CROSS-PLATFORM END CAPS

(71) Applicant: Google Inc., Mountain View, CA (US)

(72) Inventors: Avi Fein, San Francisco, CA (US); Vipul Vinod Thakur, San Francisco, CA (US); John Hicks, Los Angeles, CA (US); James Daniel McEvoy, Santa Monica, CA (US); Omair Malik, Manhattan Beach, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/082,815

(22) Filed: Mar. 28, 2016

(51) Int. Cl.
*H04N 21/235* (2011.01)
*H04N 21/234* (2011.01)
*H04N 21/472* (2011.01)

(52) U.S. Cl.
CPC ..... *H04N 21/23424* (2013.01); *H04N 21/472* (2013.01)

(58) Field of Classification Search
CPC combination set(s) only.
See application file for complete search history.

(56) References Cited

U.S. PATENT DOCUMENTS

| | | |
|---|---|---|
| 2012/0215646 A1 | 8/2012 | Geer, III et al. |
| 2012/0239510 A1 | 9/2012 | Geer, III et al. |
| 2013/0325613 A1 | 12/2013 | Pham |
| 2015/0095775 A1 | 4/2015 | Lewis et al. |

FOREIGN PATENT DOCUMENTS

| | | |
|---|---|---|
| CN | 103546782 | 1/2014 |

*Primary Examiner* — Kieu Oanh T Bui
(74) *Attorney, Agent, or Firm* — Fish & Richardson P.C.

(57) ABSTRACT

Methods, systems, and apparatus, including computer programs encoded on a computer storage medium, for providing a call to action at the end of a resource. In one aspect, a method includes receiving a request for media content to present on a user device, the request including a second request for third-party content to present with the media content, identifying, user device capabilities that describes information about system compatibility for the user device, determining third-party content to present with the media, the third-party content including a first presentation time duration indicative of a length of time the third-party content is presented, determining that an end cap is compatible with the user device and related to the third-party content, the end cap providing an interactive opportunity to request subsequent resources for the user device, and transmitting data to present the third-party content, the end cap, and the media.

21 Claims, 4 Drawing Sheets

CROSS-PLATFORM END CAPS

BACKGROUND

This specification relates to data processing.

Different devices have different capabilities. For example, mobile devices (e.g., smart phones) are generally able to initiate a phone call, while other types of devices may not be able initiate a phone call. Some content that is distributed to multiple different types of devices include embedded functionality (e.g., in end caps) which can cause the device to initiate an action.

SUMMARY

In general, one innovative aspect of the subject matter described in this specification can be embodied in methods that include the actions performed by data processing apparatus, including receiving, at a video distribution system, a request for media content to present on a user device, the request including a second request for third-party content to present with the media content, identifying, by the video distribution system and from data transmitted with the request, user device capabilities that describes information about system compatibility for the user device, determining, based on the second request, third-party content to present with the media, the third-party content including a first presentation time duration indicative of a length of time the third-party content is presented, determining that an end cap is compatible with the user device and related to the third-party content, the end cap providing an interactive opportunity to request subsequent resources for the user device, and transmitting, to the user device, data to present the third-party content, the end cap, and the media, wherein end cap data is appended at the end of the third-party content data such that the end cap is presented after the third-party content, and wherein the end cap extends the first presentation time duration of the third-party content to a second presentation time duration that is a cumulative time of presentation for the third-party content and the end cap.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Systems and methods provide users and third-party content providers with a cross platform end cap to append to third-party content irrespective of the device type to which the third-party content is being provided. The end cap is provided according to user device capabilities without requiring a third-party content to include burn-ins that are not compatible with all devices and operating systems. By providing different interaction models for the different user devices, the user device does not experience a broken video instance (e.g., where the video freezes and the user cannot take action) that is caused when the user device is provided with incompatible data or data that is not supported by the user device. The end cap includes at least one call to action element providing an opportunity to request subsequent resources. Since the end cap is provided based on user device compatibility, the call to action also provides subsequent resources that are user device compatible. User compatible end caps also provide a seamless transition between third-party content, the end cap, and the media presented. The end cap is selectively appended to third-party content, at least in part, based on capabilities of the user device to which the third-party content is being provided to ensure that a call to action provided by the end cap can be performed by the user device, thereby preventing malfunctions or errors at the user device. The technology disclosed by this document enables a still image to be presented in a video playback application for a specified duration of time, for example, by incorporating a script that generates pings that would be generated during video playback for the specified period of time. This causes the video playback application to continue presentation of the still image, and advance a visual playback indicator of the video playback application to make it appear that the endcap is part of the video presentation.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The apparatus, systems, and methods described in this document enable a third-party content provider to incorporate an end cap into various instances of third-party content in a platform agnostic manner. As used throughout this document, the phrase end cap refers to a portion of content beyond that presented by a given media file. A graphic, image, or video that is presented following playback of an audio/video file is an example of an end cap.

In some implementations, an end cap includes a call to action, which enables a user to take one or more specified actions by interacting with the end cap. For example, an end cap can include active links that initiate various actions in response to user interaction with the active links. For instance, one of the active links can initiate a request for a specified web page, while another active link may initiate a phone call to a specified phone number.

A video distribution system can determine whether or not to provide the end cap with a given instance of third-party content based, at least in part, on user device capabilities. For example, end caps that include a call to action that initiates a phone call may only be provided when the user device that will receive the third-party content is capable of initiating a phone call. Similarly, end caps can be distributed in formats compatible with specific operating systems, user devices, media player versions, etc. Thus, it is possible to provide end caps with the same content (e.g., a same video), but in different formats, that are specifically tailored to each user device. As discussed in more detail below, end caps can be appended to the third-party content, and the time duration of the third-party content, as shown on the user device, can be extended by the presentation duration of the end cap.

When the end of the third-party content is reached, and the end cap is being presented, a visual playback indicator showing playback progress of the third-party content can continue to advance based on simulated playback pings thereby giving the appearance that the endcap is part of the third-party content.

Figure 1:
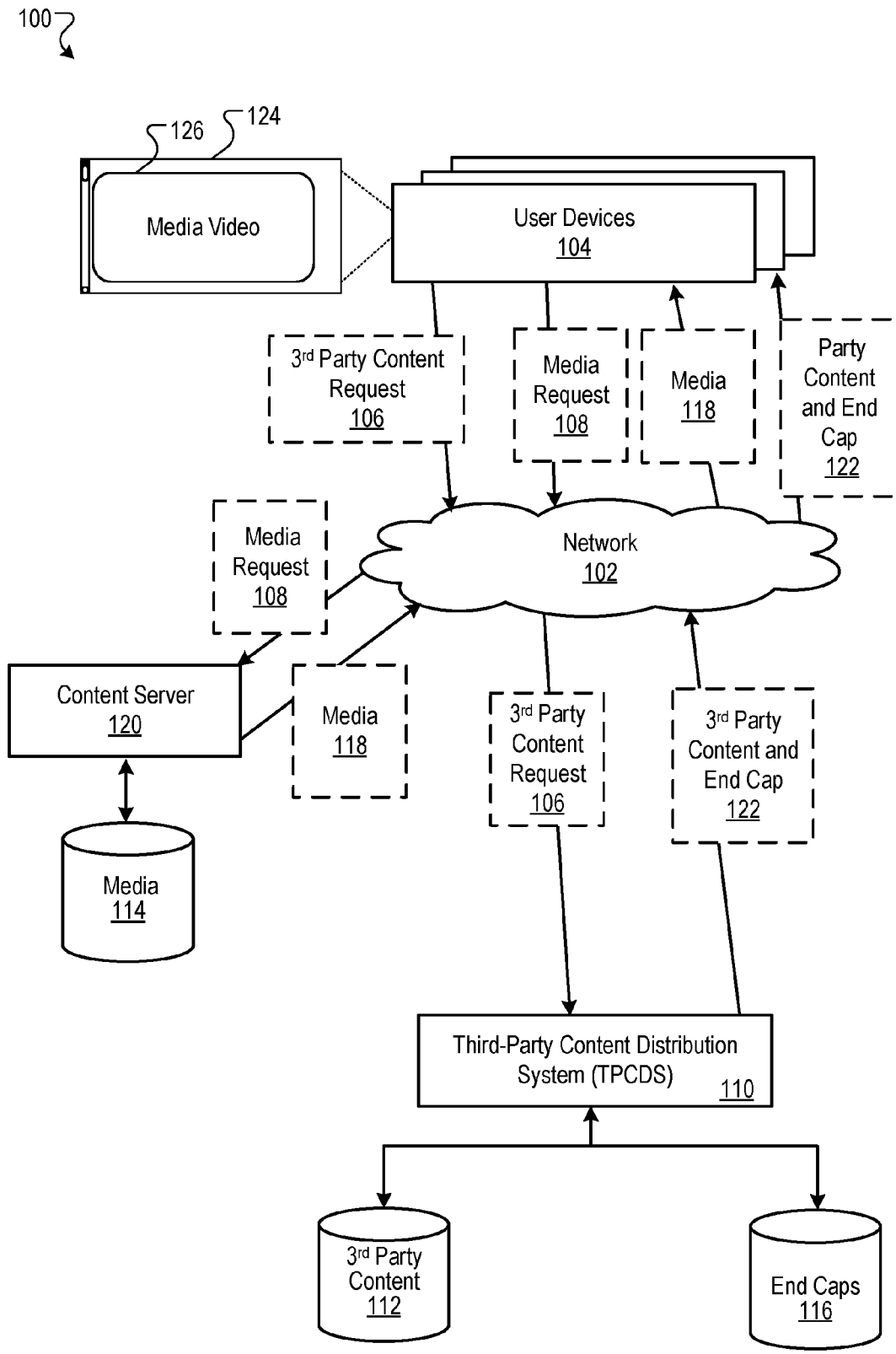
FIG. 1 is a block diagram showing an example environment for content distribution.

FIG. 1 is a block diagram of an example environment 100 in which content is distributed to user devices. A computer network 102, such as a local area network (LAN), wide area network (WAN), the Internet, or a combination thereof, connects a video distribution system 110 to user devices 104. The video distribution system 110 accesses third-party content 112, end caps 116, and media 114.

A user device 104 is an electronic device capable of requesting and receiving resources over the network 102. Example user devices 104 include personal computers, mobile communication devices (e.g., smart phones and tablet devices), and other devices that can send and receive data over the network 102. A user device 104 typically includes a user application 124, such as a web browser or native application, to facilitate the sending and receiving of data over the network 102. The user application 124 can enable a user to display and interact with text, images, videos, music and other information typically located on a web page at a web site on the World Wide Web or a local area network. For example, a user device can initiate a media request 108 that requests a given media 118 from a content server 120. The media request 108 can be generated, for example, by a user directly entering a URL of the given media 118 into a browser, or by the user device being directed to the given media 118 by an active link (e.g., a hypertext link) that when activated (e.g., through user interaction with the active link) generates the request 108. In response to receiving the media request 108, a content server 120 can provide the given media 118 to the user device 104 for presentation.

The given media 118 can include content (e.g., music, images, videos, or other content) provided by the content server 120. In some implementations, the given media 118 can include a script (e.g., one or more lines of machine readable instructions) that automatically (e.g., without human intervention) generates an electronic request 106 for third-party content (e.g., "3rd Party Content Request" in FIG. 1) when the given media 118 reaches the user device 104. As used throughout this document, third-party content refers to content (e.g., an advertisement) that is presented with media 118 (e.g., video and/or audio), but is provided by an entity that differs from the publisher of the media 118. The entity that provides the third-party content is referred to as a third-party content provider. Often, third-party content is combined with the media when the given media is presented (e.g. so that the third-party content presented with the media content can be dynamically changed on a per-request basis). In some implementations, the third-party content can be content that is not embedded in media 118, but rather only selected and shown at the beginning, end, or at some point during playback of the media 118.

The user device 104 transmits a third-party content request 106 to the third-party content distribution system (TPCDS) 110. In response to receiving the request, the TPCDS 110 identifies the third-party content that will be presented with the media 118. The TPCDS 110 includes one or more data processing apparatus that interact with the user devices 104 and distribute third-party content and/or end caps that are presented with the media 118 at the user devices 104.

In some implementations, the content server 120 may send a third-party content request 106 to the TPCDS 110. For example, when the content server 120 receives a media request 108 from the user device 104, the content server 120 can send a request to the TPCDS for third-party content. The content server 120 receives the requested third-party content and can send the given media 118 and the received third-party content to the user device 104.

The TPCDS 110 includes a third-party content data storage device 112 and an end cap data storage device 116. The third-party content data storage device 112 stores third-party content and/or various data related to the third-party content (e.g., distribution criteria, budget information, click through rates, a number of impressions, and/or a number of conversions for various portions of third-party content). In some implementations, the third-party content are advertisements that are distributed based on bids and/or the outcome of a content selection process (e.g., an auction).

In some implementations, the TPCDS 110 selects third-party content based on the outcome of an auction to select content that is provided in response to each third-party content request 106. The third-party content is ranked according to a score that, in some implementations, is based on a value of the bids (and/or other ranking parameters) associated with the content. The TPCDS 110 also selects third-party content based on information included in the third-party content request 106, distribution criteria of the third-party content, content presentation goals of the publisher, content presentation goals of third-party content providers, an informational need of a user, and/or other content selection parameters.

The TPCDS 110 provides cross platform end caps for presentation with third-party content at various user devices 104. An end cap enables third-party content providers to offer users an opportunity to take an action following presentation of the third-party content. In some implementations, the opportunity to take action is provided in the form of a call to action control. As used throughout this document, a call to action control is a user interface element that performs a specified action (e.g., based on execution of code of the call to action control) in response to user interaction (e.g., click, swipe, etc.) with the call to action control. For example, the call to action control can include a script (or other code) that, in response to detecting user interaction with the call to action control, causes the user device to initiate a telephone call, request a specified web page, open a specified native application that is installed on the user device, download a given application to the user device, or similar actions indicative of a user's desire for further action.

In some implementations, end caps are selectively presented with various third-party content, such that end caps are not necessarily appended to third-party content provided in response to each third-party content request 106. Rather, the determination of whether an end cap is appended to third-party content can be made on a per-request basis. The third-party content distribution system (TPCDS) 110 can determine whether to append an end cap to third-party content based, for example, on user device capability and/or user preferences.

The TPCDS 110 uses metadata from the third-party content request 106 to determine the user device's capability to support various available end caps. In some implementations, the TPCDS 110 uses the metadata to identify the user device type, the user device's operating system, the user device's operating system's version, native applications and native application versions installed on the user device 104, user device location and/or other data indicative of user device compatibility. For example, the TPCDS 110 can identify that a user device utilizes a given operating system, the version of the given operating system and the presence and version of a media playback application 124. Thus, the TPCDS 110 can provide an end cap that is compatible with the detected operating system version and an end cap that will play on the particular version of the media playback application 124.

In addition, TPCDS 110 may provide an end cap with a call to action that, based on the user interaction, initiates an action that is supported by the devices capabilities. In some implementations, the TPCDS 110 may provide an end cap based on whether the user device can make a phone call, install mobile native applications, runs desktop applications, utilize mobile versions of websites, and other functions indicative of the user device's capabilities. For example, when the user device 104 is not capable of making a phone call, the TPCDS 110 will not provide an end cap with a call to action that makes a phone call.

In some implementations, a user device 104 can have a broken experience. A broken experience can be when a user cannot engage the call to action as desired because the user device 104 does not have the capability to engage with the end cap. For example, an end cap may have a call to action that makes a phone call when a user interacts with the call to action. In this instance, if the user device 104 is not capable of making a phone, the user device 104 may freeze because the user device 104 is trying to execute script and/or code that the user device 104 is incapable of executing. The TPCDS 110 provides end caps compatible with the user device 104 to prevent the user device 104 from malfunctioning (e.g., freezing, resetting, locking, etc.) due to presentation (or user interaction with) an end cap that the user device is not capable of utilizing.

The TPCDS 110 can also provide end caps, not only based on user device capability, but based on user preferences and past user behaviors. In some implementations, the third-party content distribution system 110 can employ machine learning to determine user preferences. For example, machine learning techniques can be used to generate a user behavior model based on user responses to previously presented third-party content and/or end caps. The model is then used to predict user response to various end caps, and used, in part, to selectively deliver end caps on a per-request basis.

For purposes of illustration assume a given user typically interacts with shorter duration end caps and the given user has a tendency to skip longer duration end caps (e.g., by clicking a skip button or closing the media player). In this example, the model may predict that the given user is more likely to interact with end caps having a presentation time of three to five seconds. Therefore, the TPCDS 110 will provide shorter end caps because the system 110 learned (e.g., through machine learning or some other predictive process) that the user is typically responsive to shorter end caps.

In some implementations, the TPCDS 110 may also learn the types, subject, and/or topics of content presented within the third-party content and/or end caps that the given user historically interacts with during end cap presentation. In this instance, the TPCDS 110 can learn user preferences for particular topics or subjects. Thus, the TPCDS 110 can choose which end caps to provide based on learned user preferences. Further details describing TPCDS 110 data collection and analysis will be described in connection with FIG. 3.

The TPCDS 110, upon determining which third-party content to present and identifying a suitable end cap, retrieves the third-party content and the suitable end cap from their respective data storage 112, 116. The TPCDS 110 concatenates the third-party content and the end cap 122 and provides the concatenated third-party content and the suitable end cap 122 to the user device 104. The data representative of the concatenated media file 122 is transmitted for presentation on the user device 104. The TPCDS 110 provides the third-party content and the end cap 122 in a format that enables presentation to appear seamless and without glitches or interruptions. For example, the user application 124 presents the third-party content and then seamlessly transitions to presentation of the end cap 122.

In some implementation, when the end cap is appended to the third-party content, the third-party content's presentation time duration is extended by the end cap's presentation time duration. For example, assume that a given third-party content duration is 20 seconds, and that the presentation time duration of the end cap is set to 10 seconds. In this example, the presentation time duration of the third-party content can be extended to 30 seconds so that when the third-party content finishes playback, a playback timer will continue to count up to 30 seconds, thereby giving the appearance that the end cap is part of the third-party content.

Typically, user devices 104 utilize a media content player 124 for media presentation 126. The media content player 124 displays a presentation time duration for the presented media. In some implementations, during playback of the concatenated third-party content and end cap 126, the media content player 124 will display the presentation time duration of the appended end cap and third-party content in the extended time duration indicator.

Figure 2:
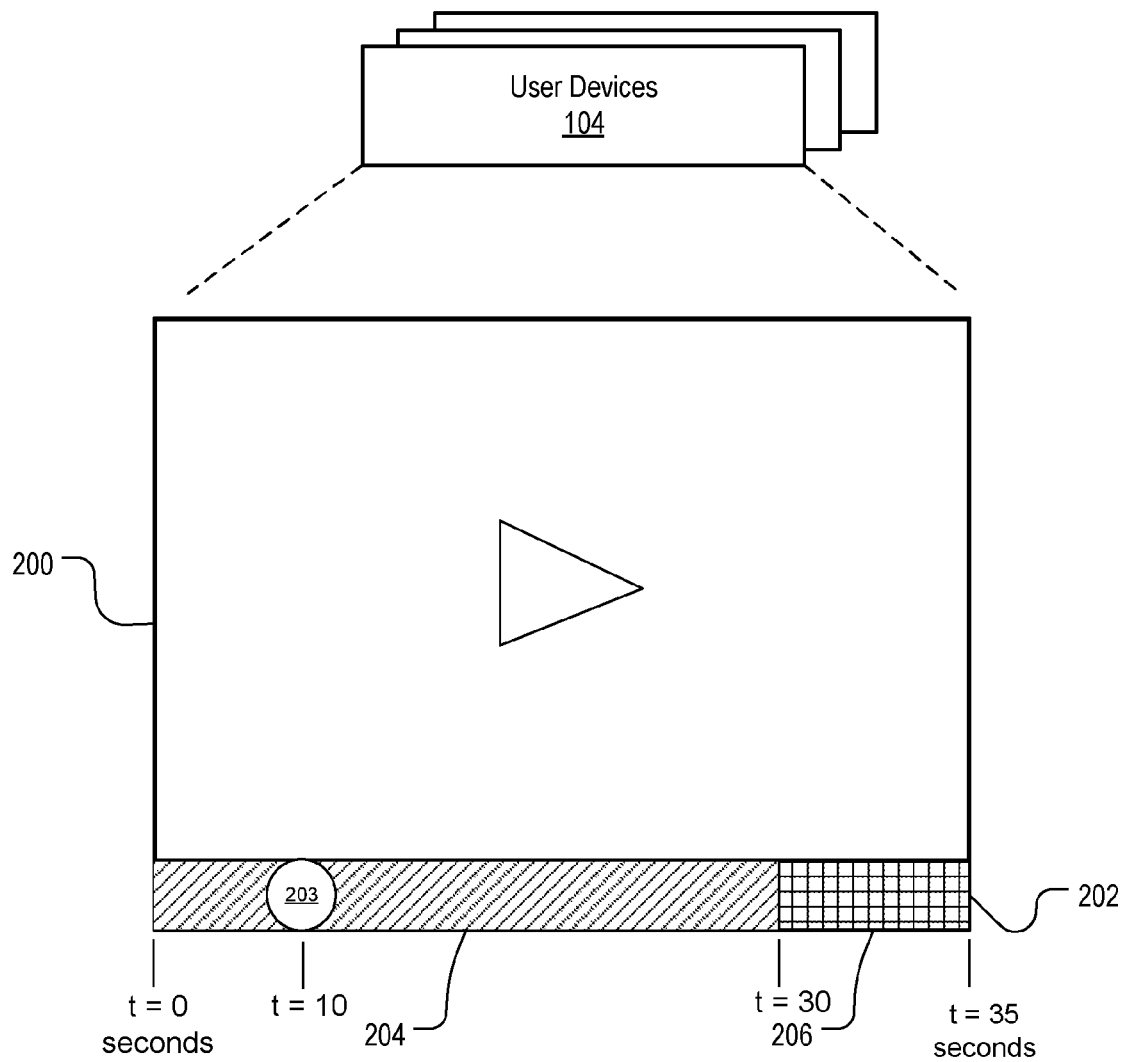
FIG. 2 is a block diagram showing a media content player with an extended time duration indicator.

FIG. 2 is a block diagram showing a media content player 200 that includes a playback indicator 202. The playback indicator 202 shows a total duration of a media file being presented by the media content player 200. For example, the playback indicator 202 shows that the total duration of the media file is 35 seconds. The playback indicator 202 includes a progress marker 203 that shows playback progress of the media file (e.g., which portion of the media file is currently being presented). For example, as shown by the progress marker 203 of FIG. 2, playback of the media file has reached the 10 second point out of a total of 35 seconds.

As discussed above, the presentation time duration of an end cap that is provided with a given third-party content can be added to the time duration of the third-party content. In this example, the third-party content duration is 30 seconds, as shown by the portion 204 of the playback indicator 202, while the presentation time duration of the end cap is 5 seconds, as shown by the portion 206 of the playback indicator 202. Therefore, the combined duration of the third-party content and the end cap presentation is 35 seconds, which is the total presentation time shown by the playback indicator. In this example, when playback of the third-party content reaches the 30 second mark (i.e., the end of the third-party content duration), the media content player 200 will seamlessly transition to presentation of the end cap for 5 an additional seconds. When the transition to the end cap occurs, the progress marker 203 will continue to advance from 30-35 seconds even though the media content has already ended.

In some implementations, the third-party content distribution system 110 generates code that causes the playback indicator 202 to display the combined durations of the third-party content and the presentation time duration of the end cap, and causes the progress marker to continue to advance after playback of the third-party content has concluded (e.g., reached 30 seconds in the example above).

Typically, during third-party content presentation, data encoded within the third-party content generates progress events (e.g., pings) at a regular interval. In some implementations, the progress events update the media content player 200 such that the progress marker progresses along the playback indicator 202. For example, a progress event may be generated every second. Thus, every second, upon receiving the progress event, the media content player 200 progresses the progress marker 203 to a location corresponding to the next second.

In some implementations, the end cap includes code that simulates progress events, similar to those generated by the third-party content, that cause the progress marker 203 to progress the playback indicator 202 during end cap presentation. The simulated progress events enable the playback indicator to continue presentation of time tracking even though the third-party content has ended, and the end cap may be a static image. In addition, the simulated progress events (or other code provided with the end cap) notify the media content player 200 that presentation of the third-party content has transitioned to presentation of the end cap to prevent errors in data that are tracked and reported to the TPCDS 110 by the media content player 200, as discussed in more detail below.

In some implementations, the playback indicator may reset when the end cap begins playing, displaying only the duration of the end cap. For example, if the third-party content duration is 30 seconds and the end cap duration is 5 seconds, during the presentation of the third-party content, the playback indicator 202 will show a total duration of 30 seconds. After the third-party content has finished presentation, the end cap will begin presentation and the playback indicator 202 will reset and display a total duration of 5 seconds.

Figure 3:
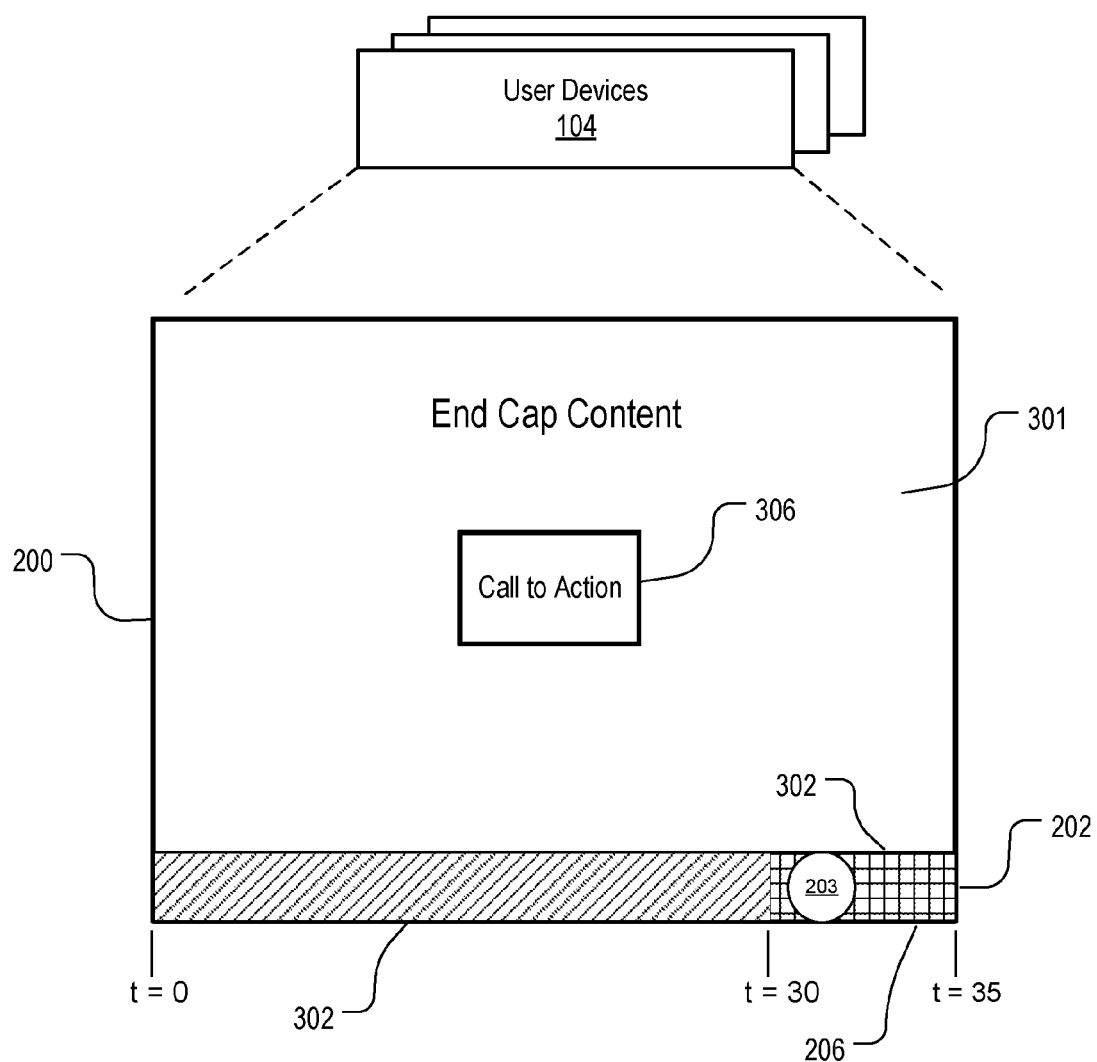
FIG. 3 is a block diagram showing a media content player displaying an end cap with a call to action.

FIG. 3 is a block diagram showing a media content player 200 displaying an end cap 301 that includes a call to action 306. In some implementations, the end cap 301 displays a static image, a video, or the last frame of the third-party content. For example, when playback of the third-party content reaches a final video frame, the final frame can remain displayed throughout the end cap presentation duration. In addition, font, color, textures, and other characteristics of the end cap can be customized by third-party content providers to match branding or for other purposes.

Embedded in the end cap is a call to action element 306 that enables the user to interact with the end cap. As previously discussed, user interaction with the call to action initiates an action that is performed by the user device. For example, the call to action may be a "contact" call to action that initiates a phone call from the user device. In some implementations, the end cap may have multiple calls to action embedded into the end cap.

As shown in FIG. 3, a progress marker 203 has progressed beyond the total duration of the third-party content (e.g., 30 seconds), and is continuing to advance based on simulated progress events (e.g., pings) that are generated based on code that is provided to the user device 104 with the end cap.

As discussed above, during the third-party content playback, the progress events generated by the third-party content cause the progress marker 203 to visually advance through the playback indicator 202. These progress events are also used for other purposes. For example, these progress events can be used to determine how much of the third-party content has been presented. For example, during each given playback of third-party content, the number (or type) of progress events that are detected may indicate that some specified portion of the third-party content was presented in the media content player 200 during that playback. More specifically, the progress events can be used to determine whether playback of the third-party content completed, whether a pre-specified portion of the third-party content was presented, and/or whether the user stopped presentation of the third-party content before playback of the third-party content (or some specified portion) completed.

In some implementations, the user device 104 transmits progress event data to the third-party content distribution system (TPCDS) 110. The progress event data can indicate the number progress events that were generated during playback of the third-party content and/or information regarding a portion of the third-party content that was presented. The TPCDS 110 uses the total duration of the third-party content and the received progress event data to determine third-party content indicators. Third-party content indicators are metrics that describe user preference characteristics for third-party content based on the received progress event data. For example, third-party content indicators can describe, for a particular third-party content, the number (or portion) of users who finished watching the third-party content, an average amount of the third-party content that was watched by users, and other metrics describing user preferences for third-party content.

As previously described, the end cap generates simulated progress events. To prevent the simulated progress events from potentially skewing measurements or statistics related to presentation of the third-party content (e.g., how many times the third-party content was completely played back by users), the media content player 200 stops monitoring progress events when the media content player 200 begins receiving simulated progress events (e.g., after an end of the third-party content has been reached). Accordingly, the media content player 200 does not use the simulated progress events for purposes of determining how long the user watched the third-party content or whether playback of the third-party content was completed.

When the media content player 200 begins receiving simulated progress events, the media content player 200 does track interaction events. In some implementations, interaction events are data indicative of a user's interaction with a call to action 306. For example, an interaction event can be created when a user skips the end cap, a user engages a call to action, a user watches the entire end cap, but does not skip or engage the end cap, and other information that describes a user's interaction with a call to action.

The media content player 200 transmits the interaction event to the TPCDS 110. The TPCDS 110 can use the interaction events to determine end cap indicators. An end cap indicator uses interaction events to determine a user's engagement with an end cap. For example, end cap indicators can describe whether a user engaged a call to action, skipped the end cap, watched the entire end cap, and other actions or inactions of a user for a particular third-party content.

The TPCDS 110 can use the determined end cap indicators and the previously described third-party content indicators to create analytic data based on user engagement and user preferences. The analytic data can provide end cap feedback and third-party content feedback to third-party content providers. For example, the TPCDS can determine the types of end caps a user prefers, whether most users skip a particular end cap, whether most users engage a particular end cap, how often users engage a particular end cap, the topics of third-party content a user prefers, and other end cap indications that can be used as informative data. In some implementations, the end cap indicators and the third-party content indicators enable the TCPDS 110 to provide information to third-party content providers regarding the level of success or interest that is generated by a particular end cap or third-party content. For example, third-party content providers can be provided with information such as which third-party content and which end caps are most effective, which types of end caps are most effective, which types of end caps and third-party content a particular demographic prefers, and other analytic measures that describe user preferences for particular end caps and third-party content.

The TCPDS 110 can provide end caps to users based on a particular user's preferences. As previously described, the TCPDS 110 can determine a given user's preferences based on the received end cap indicators and third-party content indicators. For example, the TCPDS 110 can determine if a given user prefers really short end caps (e.g., 2-5 seconds) based on the end cap indicators and the third-party content indicators. Accordingly, the TCPDS 110 determines to send the given user shorter end caps based on the determined user's preference for shorter end caps.

Figure 4:
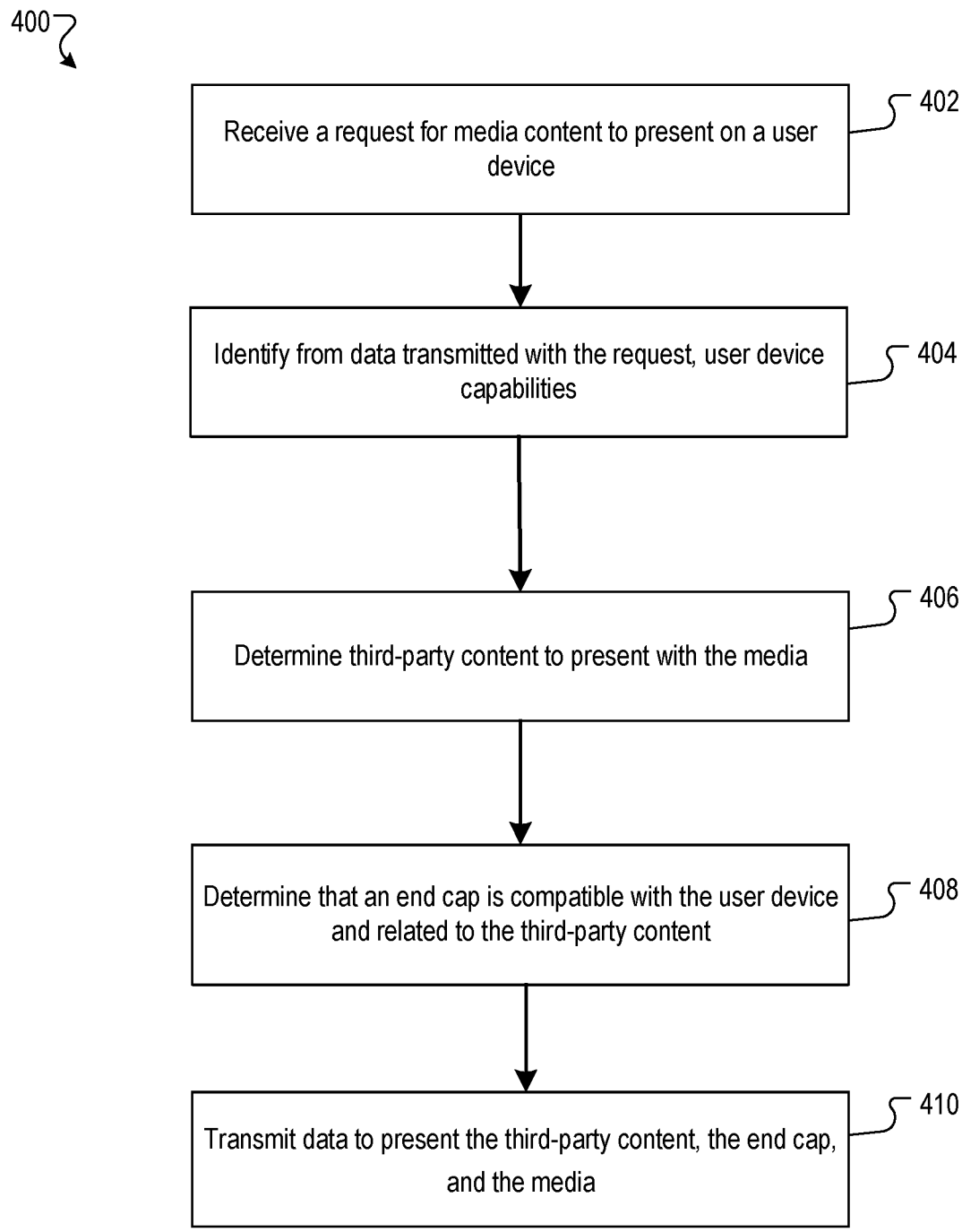
FIG. 4 is an example process that describes providing third-party content with an end cap for presentation on a user device.

FIG. 4 is an example process that describes providing third-party content with an end cap for presentation on a user device. Operations of the process 400 can be performed by one or more data processing apparatus, such as the third-party content distribution system (TPCDS) 110 of FIG. 1. Operations of the process 400 can also be implemented by instructions stored on a non-transitory computer readable medium. Execution of the instructions cause one or more data processing apparatus to perform operations of the process 400.

The TPCDS receives a request to present media content at a user device (402). In some implementations, the media content request includes a second request for third-party content, which is presented with the media content. The third-party content can be presented with media content causing presentation of both the third-party content and the media content data to be presented at the user device. The media content request can be generated from a user interaction with a link (e.g., a hyperlink), thus generating the request.

The TPCDS identifies the user device capabilities from data transmitted with the request (404). The user device capabilities describe information about the user device's ability to utilize particular end caps. A user device's ability to utilize a particular end cap can include the user device's ability to play the particular end cap on the user device and the user device's ability to receive instructions from the call to action that result in a further action that is executed on the user device. In some implementations, the user device capabilities can include the user device memory size, the user device type, the user device's operating system, the user device's operating system's version, native applications and native application versions installed on the user device 104, user device location, the type of user device and other data indicative of user device compatibility.

Based on the second request, the TPCDS determines third-party content to present with the media content (406). In some implementations, the third-party content includes a first presentation time duration indicative of a length of time the third-party content is presented. During the first presentation time duration the user application transmits progress events indicating that the third-party content is currently being presented at the user device. Thus, enabling an accurate representation of the present playback state on a progress marker indicating playback progress of the third-party content and the end cap.

The TCPDS determines that an end cap is compatible with the user device and related to the third-party content (408). In some implementations, the end cap provides a call to action that is an actionable link corresponding to a resource that is different from the third-party content, and navigates the user device to content within the resource that the actionable link corresponds. For example, the call to action is an interactive opportunity which enables a user to take one or more specified actions by interacting with the end cap. For example, an end cap can include active links that initiate various actions in response to user interaction with the active links. The various actions corresponding to interacting with the active links can include downloading a native application, making a phone call, while another may make a request for a specific web page. An end cap with the same content can be presented across various different user device platforms according to the format the TPCDS chooses for the end cap. The format of the end cap is chosen based on metadata received with the third-party content and the media request.

Data that presents the third-party content, the end cap, and the media content, is transmitted to the user device (410). In some implementations, the end cap data is appended at the end of the third-party content data such that the end cap is presented after the third-party content. Thus, the third-party content plays on the user device for the first duration and the end cap plays on the user device for a presentation time duration that is the difference between the second presentation time duration and the first presentation time duration. In some implementations, a last frame of the third-party content remains on display throughout the presentation time duration for the end cap.

In other implementations, the end cap data can be appended to the beginning or in the middle of the third-party content data. Thus, the end cap can be presented at any time during the presentation of the third-party content. In addition, the end cap extends the first presentation time duration of the third-party content to a second presentation time duration that is a cumulative time of presentation for the third-party content and the end cap.

Extending the presentation time duration can provide an accurate time presentation duration as well as provide operating points that describe when presentation of the third-party content ceases and when end cap presentation begins. In some implementations, the end cap includes coded instructions to transmit simulated progress events that continues progressing a progress marker, which is a visual display of the lapsed presentation time duration. The simulated progress events enable the user device to recognize when presentation of the third-party content ends and presentation of the end cap begins.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    receiving, at a video distribution system, a request for media content to present on a user device, the request including a second request for third-party content to present with the media content;
    identifying, by the video distribution system and from data transmitted with the request, user device capabilities that describes information about system compatibility for the user device;
    determining, based on the second request, third-party content to present with the media, the third-party content including a first presentation time duration indicative of a length of time the third-party content is presented;
    determining that an end cap is compatible with the user device and related to the third-party content, the end cap being content beyond that provided by the media content and providing an interactive opportunity to request subsequent resources for the user device; and
    transmitting, to the user device, data to present the third-party content, the end cap, and the media, wherein end cap data is appended at the end of the third-party content data such that the end cap is presented after the third-party content, wherein the end cap extends the first presentation time duration of the third-party content to a second presentation time duration that is a cumulative time of presentation for the third-party content and the end cap; and
    wherein the end cap extends the first presentation time duration of the third-party content to a second presentation time duration that is a cumulative time of presentation for the third-party content and the end cap.

2. The method of claim 1, wherein the third-party content plays on the user device for the first duration and the end cap plays on the user device for a presentation time duration that is the difference between the second presentation time duration and the first presentation time duration.

3. The method of claim 1, wherein a last frame of the third-party content remains on display throughout the presentation time duration for the end cap.

4. The method of claim 1, wherein user device capabilities include at least one of the following: user device memory size, user device operating system, user device operating system version, installed applications on a user device, or type of user device.

5. The method of claim 1, wherein the end cap displays a call to action.

6. The method of claim 5, wherein the call to action is an actionable link that corresponds to a resource that is different from the third-party content, and navigates the user device to content within the resource that the actionable link corresponds.

7. The method of claim 1, wherein the end cap includes coded instructions to transmit simulated progress events that continues progressing a visual display of a lapsed presentation time duration.

8. A system, comprising:
    a data processing apparatus; and
    software stored in non-transitory computer readable storage medium storing instructions executable by the data processing apparatus and that upon such execution cause the data processing apparatus to perform operations comprising:
    receive, at a video distribution system, a request for media content to present on a user device, the request including a second request for third-party content to present with the media content;
    identify, by the video distribution system and from data transmitted with the request, user device capabilities that describes information about system compatibility for the user device;
    determine, based on the second request, third-party content to present with the media, the third-party content including a first presentation time duration indicative of a length of time the third-party content is presented;
    determine that an end cap is compatible with the user device and related to the third-party content, the end cap providing an interactive opportunity to request subsequent resources for the user device; and
    transmit, to the user device, data to present the third-party content, the end cap, and the media, wherein end cap data is appended at the end of the third-party content data such that the end cap is presented after the third-party content; and
    wherein the end cap extends the first presentation time duration of the third-party content to a second presentation time duration that is a cumulative time of presentation for the third-party content and the end cap.

9. The system of claim 8, wherein the third-party content plays on the user device for the first duration and the end cap plays on the user device for a presentation time duration that is the difference between the second presentation time duration and the first presentation time duration.

10. The system of claim 8, wherein a last frame of the third-party content remains on display throughout the presentation time duration for the end cap.

11. The system of claim 8, wherein user device capabilities include at least one of the following: user device memory size, user device operating system, user device operating system version, installed applications on a user device, or type of user device.

12. The system of claim 8, wherein the end cap displays a call to action.

13. The system of claim 12, wherein the call to action is an actionable link that corresponds to a resource that is different from the third-party content, and navigates the user device to content within the resource that the actionable link corresponds.

14. The system of claim 8, wherein the end cap includes coded instructions to transmit simulated progress events that continues progressing a visual display of a lapsed presentation time duration.

15. A computer storage medium encoded with a computer program, the program comprising instructions that when executed by data processing apparatus cause the data processing apparatus to perform operations comprising:

receiving, at a video distribution system, a request for media content to present on a user device, the request including a second request for third-party content to present with the media content;

identifying, by the video distribution system and from data transmitted with the request, user device capabilities that describes information about system compatibility for the user device;

determining, based on the second request, third-party content to present with the media, the third-party content including a first presentation time duration indicative of a length of time the third-party content is presented;

determining that an end cap is compatible with the user device and related to the third-party content, the end cap providing an interactive opportunity to request subsequent resources for the user device; and transmitting, to the user device, data to present the third-party content, the end cap, and the media, wherein end cap data is appended at the end of the third-party content data such that the end cap is presented after the third-party content; and wherein the end cap extends the first presentation time duration of the third-party content to a second presentation time duration that is a cumulative time of presentation for the third-party content and the end cap.

16. The computer storage medium of claim 15, wherein the third-party content plays on the user device for the first duration and the end cap plays on the user device for a presentation time duration that is the difference between the second presentation time duration and the first presentation time duration.

17. The computer storage medium of claim 15, wherein a last frame of the third-party content remains on display throughout the presentation time duration for the end cap.

18. The computer storage medium of claim 15, wherein user device capabilities include at least one of the following: user device memory size, user device operating system, user device operating system version, installed applications on a user device, or type of user device.

19. The computer storage medium of claim 15, wherein the end cap displays a call to action.

20. The computer storage medium of claim 15, wherein the call to action is an actionable link that corresponds to a resource that is different from the third-party content, and navigates the user device to content within the resource that the actionable link corresponds.

21. The computer storage medium of claim 15, wherein the end cap includes coded instructions to transmit simulated progress events that continues progressing a visual display of a lapsed presentation time duration.

\* \* \* \* \*